(12) United States Patent
Detwiler

(10) Patent No.: US 7,597,116 B2
(45) Date of Patent: Oct. 6, 2009

(54) MARINE GREYWATER DISPOSAL SYSTEM

(76) Inventor: Brett Howard Detwiler, 6479 Red Garnet Ct., Las Vegas, NV (US) 89131

( * ) Notice: Subject to any disclaimer, the term of this patent is extended or adjusted under 35 U.S.C. 154(b) by 192 days.

(21) Appl. No.: 11/279,150

(22) Filed: Apr. 10, 2006

(65) Prior Publication Data

US 2007/0235097 A1    Oct. 11, 2007

(51) Int. Cl.
*E03D 11/00*    (2006.01)
(52) U.S. Cl. .................. 137/899.2; 137/396; 417/36
(58) Field of Classification Search ............. 137/899.2, 137/396; 4/625–626, 664–665, 321, 602–603; 417/36, 40
See application file for complete search history.

(56) References Cited

U.S. PATENT DOCUMENTS

| | | | | |
|---|---|---|---|---|
| 4,548,226 A * | 10/1985 | Iino et al. ................. 73/453 |
| 4,903,723 A * | 2/1990 | Sublett ........................ 417/36 |
| 5,139,655 A * | 8/1992 | Sigler ......................... 210/140 |
| 5,701,932 A * | 12/1997 | Bourscheid et al. ......... 137/558 |
| 5,931,642 A * | 8/1999 | Friedman et al. ............. 417/36 |
| 6,397,407 B1 * | 6/2002 | Dahlberg ...................... 4/321 |

\* cited by examiner

*Primary Examiner*—John Fox
(74) *Attorney, Agent, or Firm*—Veronica-Adele R. Cao; Weiss & Moy, P.C.

(57) ABSTRACT

An improved greywater disposal system is provided which substantially eliminates onboard standing greywater. The system includes one or more onboard plumbing fixtures fluidly connected to a greywater sump. The bottom of the greywater sump is sloped toward a drain therein at a low end. The prongs of a sensor may be suspended in the sump drain and/or in an inlet chamber defined at an inlet end of the greywater sump. The sensor is associated with a controller and sump or bilge pump. The pump is turned on when the prong tips of the sensor become immersed in greywater which occurs substantially simultaneously with the production of the greywater. The onboard plumbing fixtures include one or more sinks, showers, bathtubs, washing machines and air conditioning units. The system may be used on boats, ships, RVs, campers or the like.

16 Claims, 3 Drawing Sheets

MARINE GREYWATER DISPOSAL SYSTEM

FIELD OF THE INVENTION

This invention relates generally to an improved greywater disposal system. More specifically, this invention relates to a marine greywater disposal system.

BACKGROUND OF THE INVENTION

A boat may be equipped with onboard washing facilities such as a washing machine, shower, bathtub and sinks. The boat may also be equipped with one or more air conditioners which produce condensate. Greywater discharges originate from such onboard sinks, showers, bathtubs, air conditioners (as condensate), and washing machines. Greywater is defined herein as "used water discharged from a boat, ship, RV, camper or the like, other than sewage or septage."

Greywater has typically been collected in a sump equipped with a float switch to control (turn on and off) a sump/bilge pump. The float switch may be housed within a strainer. The float switch is electrically connected to the sump/bilge pump. The float switch is typically mounted on the floor of the sump. The typical sump has a flat floor. The drain for the sump equipped with a float switch may be found in an endwall or sidewall. The float rises simultaneously with the rising greywater. The rising float on the float switch physically closes an electrical circuit activating the sump/bilge pump. The sump/bilge pump evacuates the greywater from the sump, pumping the greywater overboard or into a greywater holding tank. The float switch lowers simultaneously with the evacuating greywater. As the greywater level lowers to a point above the floor of the sump, the float switch physically opens the same electrical circuit deactivating the sump/bilge pump. This cycle repeats itself automatically.

Unfortunately, this system fails to evacuate all the greywater within the sump. The residual greywater stagnates within the sump causing biological growth with associated odors. Unlike home plumbing systems, boat plumbing systems typically have no drain trap; drain traps prevent odors from drains entering a home. Odors from the current systems permeate the boat cabin. The biological growth may interfere with normal operation of the current systems causing their failure. Thus, greywater enters the sump, but does not completely discharge. These failures may cause backups, gross contamination and odor throughout the boat. Components for the current systems also require regular time-consuming and expensive maintenance and repair, often causing unexpected delays at dock.

Accordingly, there has been a need for a novel improved marine greywater disposal system and method which is of simplified construction, reliable, self-sustaining with substantially little or no maintenance, repair, or replacement, and substantially effective at automatically discharging greywater when washing or using an air conditioner onboard. There is also a need for a novel marine greywater disposal system for minimizing onboard biological growth and odor from greywater sumps. The present invention fulfills these needs and provides other related advantages.

SUMMARY OF THE INVENTION

The present invention resides in an improved greywater disposal system and method which are configured for automatic disposal of greywater from onboard plumbing fixtures such as from at least one sink, shower, bathtub, washing machine and air conditioner or combination thereof. The system comprises, generally, a greywater sump for receiving greywater from one or more onboard plumbing, fixtures and at least one sensor mounted in the greywater sump that activates a pump to automatically discharge substantially all the greywater from the greywater sump overboard or to a greywater holding tank substantially simultaneously with the production of the greywater i.e. during onboard washing activities, wherein the greywater sump has a bottom wall sloped toward a sump drain defined therein.

The plumbing fixture includes a drain in a lower portion thereof in fluid communication with the greywater sump. The greywater sump may be substantially rectangular with a first and second endwall, a pair of sidewalls, a top wall, and the bottom wall sloped toward the sump drain defined therein. A plurality of inlet ports may be defined in the first endwall.

The at least one sensor includes sensor prongs. When the greywater inside the sump rises during onboard washing activities (or during operation of the air conditioner) and touches the tips of the sensor prongs, the greywater completes an electrical circuit activating the sump pump to pump the greywater out of the sump through the sump drain.

When the greywater level falls and exposes the sensor probe tips, current will not flow through the circuit. A controller associated with the sensor may be programmed to allow the pump to continue pumping for a selected period of time after the current stops to substantially empty any residual greywater in the sump. When the circuit opens or after the delay, the sump pump will switch off.

In one embodiment, the sensor prongs may be suspended in the upper portion of the sump drain with the sensor mounted in the greywater sump proximate the sump drain.

In another embodiment, a chamber wall between the first endwall and the sump drain may define an inlet chamber within the sump. The chamber wall has at least one opening to permit greywater egress from the inlet ports to the sump drain. The at least one opening may be at a bottom edge of the chamber wall. The at least one sensor may be mounted on the chamber wall with the sensor prong tips suspended proximate the at least one opening at the bottom edge of the chamber wall.

In another embodiment, the at least one sensor may be mounted in the greywater sump proximate the sump drain and proximate the at least one opening at the bottom edge of the chamber wall.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
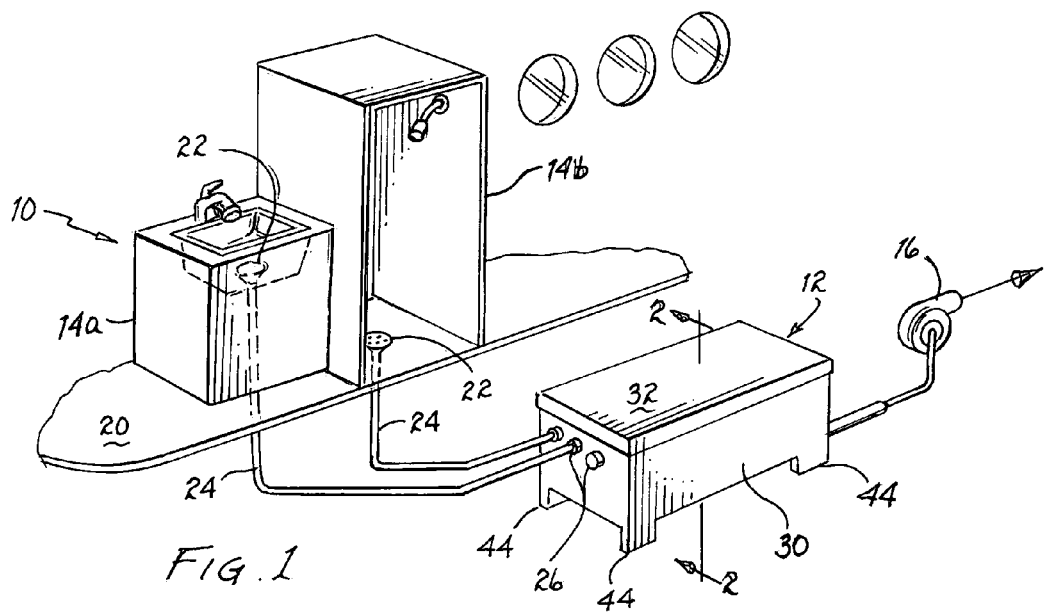
FIG. 1 is a perspective environmental view of a greywater disposal system embodying the invention, illustrating an exemplary sink and shower stall from which greywater is drained to a greywater sump from where it is pumped overboard (not shown) or to a greywater holding tank (not shown)

As shown in FIGS. 1-9 for purposes of illustration, the present invention is concerned with an improved greywater disposal system, generally designated in the accompanying drawings by the reference number 10. The system 10 comprises, generally, a greywater sump 12 for receiving greywater from one or more onboard plumbing fixtures 14a-b, a pump 16 in fluid communication with the greywater sump, and at least one sensor 18 mounted in the greywater sump and associated with a controller 50 to activate the pump to automatically discharge substantially all the greywater from the greywater sump substantially simultaneously with the production of the greywater, wherein the greywater sump has a bottom wall 34 sloped toward a sump drain 36 defined therein. As used herein, the term "plumbing fixtures" means sinks, showers, bathtubs, air conditioners, and washing machines.

As shown in FIG. 1, the plumbing fixture (i.e. sink 14a, shower 14b, bathtub (not shown), washing machine (not shown)) may be affixed to a wall and/or floor 20 and connected to a water supply (not shown). As is known in the art, the plumbing fixture includes a drain 22 in a lower portion thereof in fluid communication with a drain pipe 24 that typically extends through the underlying floor 20 and connects with a drain pipe that leads to one of a plurality of inlet ports 26 in the sump 12. The drain 22 may be covered with a drain cover (not shown). The plumbing fixture may also be an air conditioner (not shown) in fluid communication with at least one of the inlet ports 26 in the sump 12.

Figure 2:
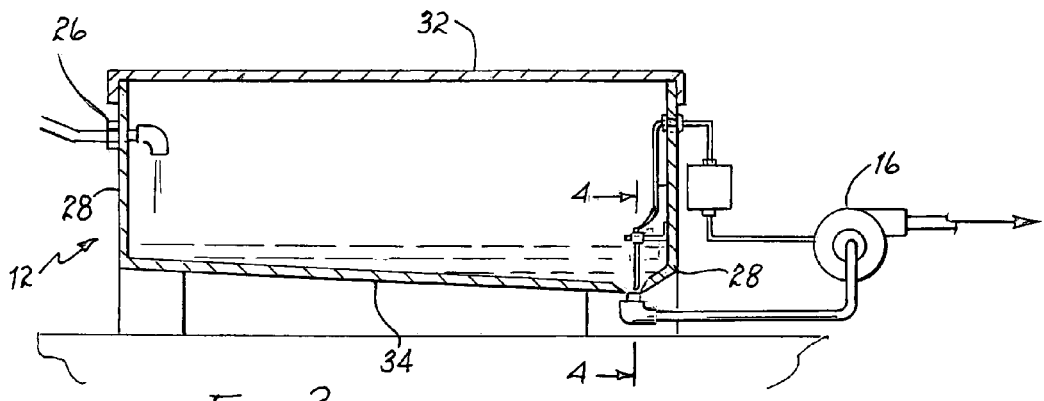
FIG. 2 is a sectional view of the greywater sump, taken generally along the line 2-2 of FIG. 1.
Figure 3:
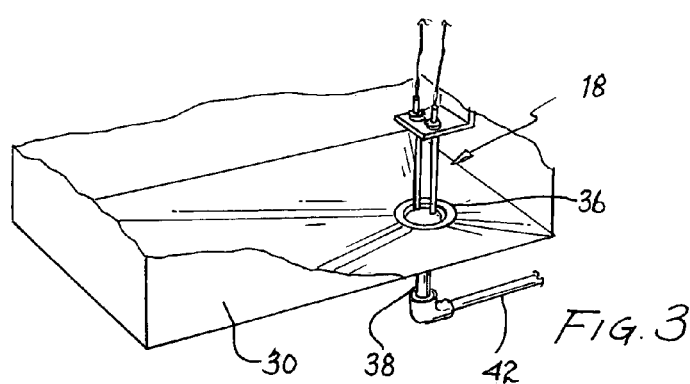
FIG. 3 is a partial cutaway view of the greywater sump, illustrating a bottom wall thereof sloped toward a sump drain defined therein and a sensor having dual prongs suspended in the upper portion of the sump drain.
Figure 8:
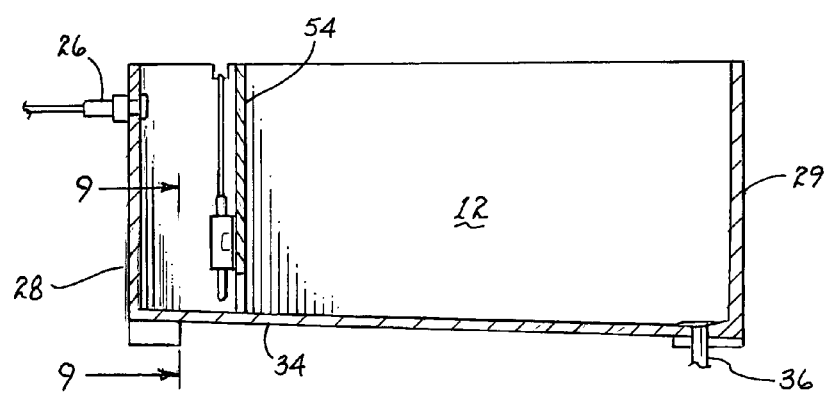
FIG. 8 is a sectional view of the greywater sump of FIG. 7, illustrating the sensor mounted to a chamber wall defining the inlet chamber.

As shown in FIG. 2, the greywater sump may be mounted below the level of the drain of the plumbing fixture. The greywater sump 12 may be mounted in a bilge of a boat. As shown in FIGS. 1-3, the greywater sump may be substantially rectangular with a first and second endwall 28 and 29, a pair of sidewalls 30, a top wall 32, and the bottom wall 34. The top wall may be removable. The plurality of inlet ports 26 may be defined in the first endwall 28 at an inlet end of the sump 40, as shown in FIG. 1. The sump drain 36 may be defined in the bottom wall 34 preferably proximate the second endwall 29. The sump drain may remain open. The sump drain 36 may be in fluid communication with a fitting 38 extending away from the greywater sump which connects to a drain pipe 42, although other drain pipe configurations may be used within the confines of the invention. As shown in FIG. 3, the bottom wall 34 of the sump 12 may be sloped toward the sump drain 36 to direct the greywater in the sump to the sump drain in the bottom wall. The drain is a "low point" in the sump. Although a substantially rectangular sump has been described, it is to be appreciated that other shapes may be used. The sump may include feet 44 as shown in FIGS. 1 and 8. An exemplary rectangular greywater sump may have measurements of about 11 inches long×about 8 inches wide by about 5 inches high, although the measurements may vary depending on a number of factors including, but not limited to, the size of the boat, etc.

Figure 4:
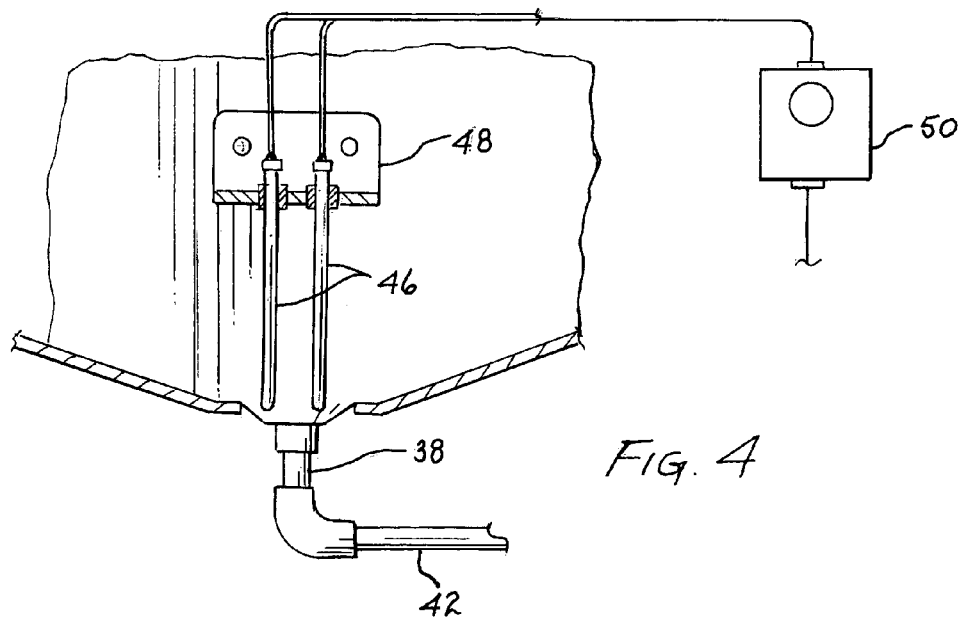
FIG. 4 is a partial interior view of the end wall of the greywater sump with the sensor mounted thereon and the circuit between the sensor and associated controller, taken generally along the line 4-4 of FIG. 2.

As shown in FIG. 4, the at least one sensor 18 may be a dual prong conductive electrode sensor having a pair of sensor prongs 46. The sensor prongs may be about 2.5 inches long, although other lengths may be used. The tips of the sensor prongs should be sufficiently distanced from the bottom wall of the greywater sump to substantially avoid contact with possible debris at the bottom of the greywater sump. The at least one sensor 18 may be mounted inside the greywater sump by a mounting plate 48, or in a waterproof sensor housing 49 (FIG. 6) or the like.

Figure 5:
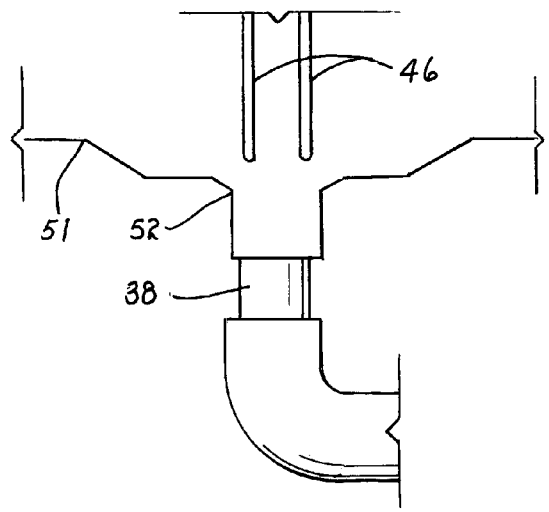
FIG. 5 is a view of the sump drain, illustrating the dual prongs of the sensor suspended in the upper portion of the sump drain.
Figure 6:
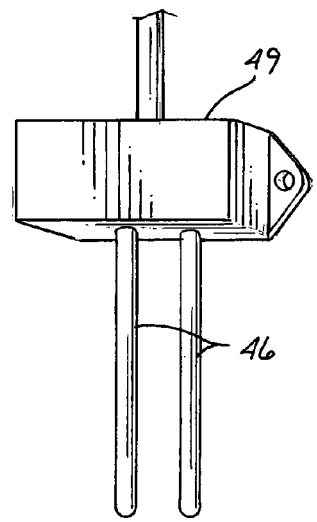
FIG. 6 is a view of an alternative embodiment of the sensor (exclusive of the dual prongs) within a housing.

In one embodiment as shown in FIGS. 2-5, the at least one sensor 18 may be mounted with the pair of sensor prongs 46 suspended vertically over the sump drain 36 with at least the tips thereof positioned in an upper portion of the sump drain 36 as shown in FIG. 5. The top and bottom of the sump drain are designated respectively as 51 and 52 in FIG. 5. It is to be appreciated that the sensor 18 or sensor within a housing 49 may be mounted on the second endwall 29 or sidewalls 30 of the sump proximate the sump drain, with the sensor tips 46 suspended in substantially the center of the sump drain 36 to allow for clearance between the sensor prongs and the walls of the sump drain.

Figure 7:
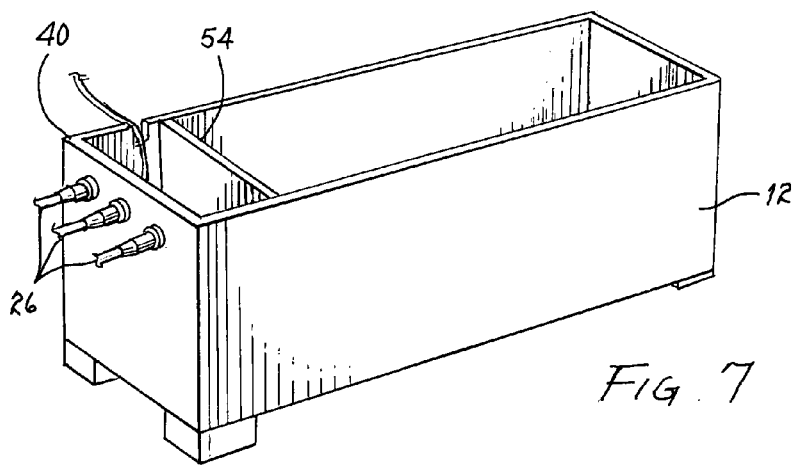
FIG. 7 is a perspective view of an alternative embodiment of the greywater sump with a top wall removed, illustrating an inlet chamber of the greywater sump.
Figure 9:
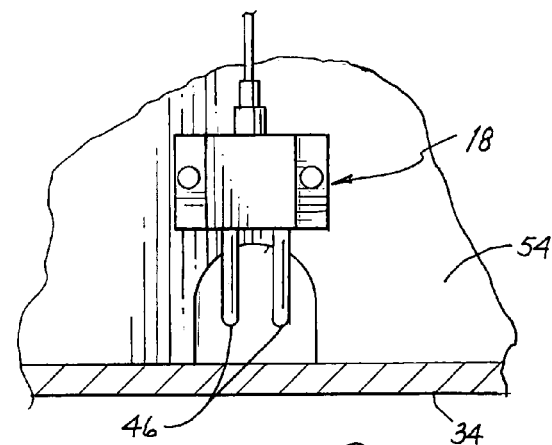
FIG. 9 is an enlarged view of the bottom portion of the chamber wall taken generally along the line 9-9 of FIG. 8, illustrating an opening at a bottom edge of the chamber wall with the dual prongs suspended proximate the opening.

In another embodiment as shown in FIGS. 7-9, the greywater sump 12 may further have a chamber wall 54 between the first endwall 28 and the sump drain 36 to define an inlet chamber 37 at the inlet end of the sump 39. The inlet end of the sump is preferably defined herein as approximately the first quarter lengthwise of the greywater sump i.e. the chamber wall 54 bisects the greywater sump at approximately one quarter of the length of the greywater sump. However, it is to be appreciated that substantial benefit may also be realized if the chamber wall 54 is positioned less than or greater than one-quarter so long as it is positioned closer to the first endwall 28 than to the sump drain 36. The chamber wall 54 has at least one opening 56 to permit greywater egress from the inlet chamber to the sump drain 36. One of the at least one opening 56 may be at the bottom of the chamber wall 54. The at least one sensor 18 or sensor within a housing 49 may be mounted on the chamber wall 54 proximate the opening at the bottom of the chamber wall. Preferably, the sensor may be mounted on the chamber wall within the inlet chamber as shown in FIGS. 8-9 but it is to be appreciated that the sensor may be mounted on the other side of the chamber wall. The sensor may be mounted such that the sensor prong tips extend about at least a portion of the opening 56 at the bottom of the chamber wall, as shown in FIG. 9.

Once the top of the greywater sump has been removed to gain access to the chamber wall, the chamber wall may be removed to permit substantially easy cleaning of the sensor. For example, the chamber wall may be connected by a mortise and tenon joint (not shown) or the like to the sidewalls 30 of the greywater sump to permit sliding the chamber wall 54 in and out of the greywater sump for cleaning of the sensor.

It is to be appreciated that mounting of the at least one sensor proximate both the sump drain and in the inlet chamber may also derive substantial benefit. Such an arrangement may be particularly desirable in cases where the volume of greywater is too low (for example, from air conditioner condensate) to activate the sensor in the inlet chamber, but the sensor in the upper portion of the sump drain will activate upon the inevitable draining of the greywater through the sump drain.

The at least one sensor 18 may be electrically connected to the associated controller 50. The controller 50 may be incorporated into the sensor housing, if used. Although a dual prong conductive electrode sensor has been described, other electronic switches or sensors may be used within the confines of the invention.

When the greywater inside the sump rises during onboard washing activities (or during operation of the air conditioner) and touches the tips 46 of the dual prong conductive electrode sensor(s) (which occurs substantially simultaneously with the production of greywater), it completes an electrical circuit through the associated controller 50 to start the sump pump 16. With the sensor tips immersed in water, the water acts as a conductor to close the electrical circuit activating the sump pump. When the pump is activated, the sump pump 16 pumps greywater from the sump to be discharged overboard (not shown) or to a greywater holding tank (not shown).

When the water level lowers and exposes the sensor tips 46, current will not flow through the electrical circuit. The controller 50 may be programmed to allow the pump 16 to continue pumping for a selected period of time after the current stops to substantially empty any residual greywater in the sump. When the circuit opens or after the delay, the sump pump will switch off. Although a sump pump has been described, it is to be appreciated that a bilge pump suspended within the sump may be used within the confines of the invention.

A method of disposing of onboard greywater is also provided. The method comprises the steps of providing a greywater sump in fluid communication with one or more onboard plumbing fixtures, said greywater sump having a sump drain at a low point thereof and providing at least one sensor in said greywater sump to close an electrical circuit to automatically control an associated pump to pump said greywater out of the greywater sump during onboard washing activity.

Although the greywater disposal system has been described for use in a boat, it is to be appreciated that such system may also be used to dispose of greywater from an RV, ship, camper or the like.

From the foregoing, it is to be appreciated that the improved greywater disposal system and method provide for reliable and automatic disposal of greywater almost simultaneously with its production thus giving the greywater little time to collect onboard thereby substantially eliminating greywater disposal system failures, as well as biological growth, and odor inside the interior of a boat or the like. The improved greywater disposal system and method are also substantially self-sustaining requiring little or no maintenance, repair, or replacement.

Although a particular embodiment of the invention has been described in detail for purpose of illustration, various modifications may be made without departing from the spirit and scope of the invention. Accordingly, the invention is not to be limited, except as by the appended claims.

I claim:

1. A greywater disposal system for onboard plumbing fixtures, comprising:
   a greywater sump for receiving greywater from one or more onboard plumbing fixtures, the greywater sump having a sump drain in a bottom wall, the bottom wall sloped toward the sump drain;
   a pump in fluid communication with the greywater sump;
   at least one sensor mounted within the greywater sump and associated with a controller for automatically activating the pump simultaneously with the introduction of greywater into the sump to dispose of the greywater within the greywater sump;
   wherein the sump drain has an upper portion and a lower portion;
   wherein the at least one sensor is a conductive electrode sensor with a pair of sensor prongs; and
   wherein the conductive electrode sensor is suspended vertically above a center of the sump drain and both tips of the sensor prongs are positioned in the upper portion of the sump drain.

2. The greywater disposal system of claim 1, wherein the greywater sump comprises a first and second endwall, a pair of sidewalls, a top wall, and the bottom wall, the bottom wall sloped from the first and second endwalls toward the sump drain and from the pair of sidewalls toward the sump drain.

3. The greywater disposal system of claim 1, wherein the greywater sump further comprises a chamber wall between the first endwall and the sump drain, the chamber wall defining an inlet chamber at one end of the greywater sump and the chamber wall extending to the bottom wall of the sump and having at least one opening at a bottom portion thereof to permit egress of greywater from the inlet chamber to the sump drain, the at least one sensor mounted on the chamber wall.

4. The greywater disposal system of claim 3, wherein the at least one sensor is mounted on the chamber wall within the inlet chamber of the greywater sump and wherein the tips of the sensor prongs extend across a portion of the opening at the bottom portion of the chamber wall and are positioned in the upper portion of the sump drain.

5. The greywater disposal system of claim 3, wherein one sensor is mounted proximate the sump drain and at least a portion of the pair of sensor prongs is positioned within an upper portion of the sump drain and wherein a second sensor is mounted on the chamber wall within the inlet chamber of the greywater sump.

6. The greywater disposal system of claim 1, wherein the one or more onboard plumbing fixtures are on a boat.

7. The greywater disposal system of claim 1, wherein the pump is a bilge pump suspended within the greywater sump.

8. The greywater disposal system of claim 1, wherein the pump is a sump pump.

9. A greywater disposal system, comprising:
   a greywater sump having a first and second endwall, a pair of sidewalls, a top wall, and a bottom wall, the bottom wall defining a sump drain and sloped toward the sump drain;
   a plurality of inlet ports in the first endwall and an inlet chamber defined at one end of the greywater sump by a chamber wall between the first endwall and the sump drain, the chamber wall having an opening at the bottom thereof to permit egress of the greywater from at least one of the plurality of inlet ports to the sump drain;
   a pump for pumping the greywater out of the greywater sump; and
   at least one sensor mounted on the chamber wall inside the inlet chamber of the greywater sump and associated with a controller for automatically activating the pump as greywater exits the inlet chamber through the opening in the chamber wall to discharge the greywater from the greywater sump simultaneously with the introduction of greywater into the sump;
   wherein the at least one sensor is a conductive electrode sensor with a pair of sensor prongs; and
   wherein tips of the sensor prongs extend across a portion of the opening at the bottom of the chamber wall, are suspended vertically above a center of the sump drain, and are positioned in an upper portion of the sump drain.

10. The greywater disposal system of claim 9, wherein the greywater sump receives greywater through one or more drain pipes from one or more onboard plumbing fixtures.

11. The greywater disposal system of claim 10 wherein the one or more onboard plumbing fixtures are on a boat.

12. The greywater disposal system of claim 9, wherein the pump turns off after a delay to substantially empty the greywater sump.

13. A method of disposing of onboard greywater comprising the steps of:
 providing a greywater sump for receiving greywater from onboard washing activity using one or more onboard plumbing fixtures, said greywater sump having a sump drain at a low point thereof; and
 providing at least one sensor in said greywater sump to close an electrical circuit to automatically activate an associated pump to pump said greywater out of the greywater sump during the onboard washing activity simultaneously with the introduction of greywater into the sump;
 wherein the sump drain has an upper portion and a lower portion;
 wherein the at least one sensor is a conductive electrode sensor with a pair of sensor prongs; and
 wherein the conductive electrode sensor is suspended vertically above a center of the sump drain and both tips of the sensor prongs are positioned in the upper portion of the sump drain.

14. The method of claim 13, wherein the electrical circuit opens when the greywater sump is substantially empty and the pump turns off after a delay following the opening of the electrical circuit.

15. The method of claim 13, wherein the greywater sump comprises a first and second endwall, a pair of sidewalls, a top wall, and a bottom wall, the bottom wall sloped toward the sump drain defined therein.

16. The method of claim 15, wherein the greywater sump further comprises a chamber wall between the first endwall and the sump drain, the chamber wall defining an inlet chamber at one end of the greywater sump and having at least one opening therein to permit egress of the greywater from the inlet chamber to the sump drain, the at least one sensor mounted on the chamber wall.

* * * * *